(12) United States Patent
Asano

(10) Patent No.: US 6,472,032 B1
(45) Date of Patent: Oct. 29, 2002

(54) DOUBLE-GLAZING UNIT

(75) Inventor: Osamu Asano, Nagaokakyo (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/529,519

(22) PCT Filed: Mar. 15, 1999

(86) PCT No.: PCT/JP99/01277

§ 371 (c)(1),
(2), (4) Date: Apr. 13, 2000

(87) PCT Pub. No.: WO99/47466

PCT Pub. Date: Sep. 23, 1999

(30) Foreign Application Priority Data

Mar. 17, 1998 (JP) .......................................... 10-066932

(51) Int. Cl.$^7$ .............................. E06B 3/24; E04C 2/54
(52) U.S. Cl. ....................................... 428/34; 52/786.13
(58) Field of Search .......................... 428/34, 120, 192; 52/786.13; 156/107, 109

(56) References Cited

U.S. PATENT DOCUMENTS 5,643,644 A * 7/1997 Demars ....................... 428/34

FOREIGN PATENT DOCUMENTS

| JP | 01224248 | 9/1989 |
| JP | 04048230 | 4/1992 |
| JP | 10017579 | 1/1994 |
| JP | 08259276 | 10/1996 |
| JP | 09278468 | 10/1997 |
| JP | 11021149 | 1/1999 |

* cited by examiner

Primary Examiner—Donald J. Loney
(74) Attorney, Agent, or Firm—Fulbright & Jaworski L.L.P.

(57) ABSTRACT

A double glazing having a plurality of sheet glass (1) (2) juxtaposed in the direction of thickness with spacers (3) arranged in between, peripheries of these sheet glasses (1) (2) being sealed throughout the circumference thereof. Reinforced sheet glass is employed for at least one of the plurality of sheet glasses (1) (2), and the peripheries of the sheet glasses are sealed by a sealing material having a sealing temperature below 400° C.

28 Claims, 3 Drawing Sheets

DOUBLE-GLAZING UNIT

TECHNICAL FIELD

The present invention relates to a double glazing having a plurality of sheet glasses juxtaposed in the direction of thickness with spacers arranged in between, peripheries of these sheet glasses being sealed throughout the circumference thereof.

BACKGROUND ART

Generally, the above double glazing is sealed at the peripheries thereof with an organic sealant, but this has been unsatisfactory in fully inhibiting gas transmission. Thus, it has been considered to seal with low melting point glass having a high sealing performance with respect to gas, instead of using the organic sealant. However, the low melting point glass used conventionally is baked at 450° C. or higher, and ordinary sheet glass is used as the above sheet glasses.

Recently, the above double glazing has been required to have both functions of high strength glass and thermal insulation performance where it is desired to use the double glazing as window panes of multistory buildings or glass for vehicles in which a high degree of wind pressure resistance is required, or as window panes or the like required to have fire retardant property.

However, the conventional double glazing noted above has a problem that its strength could be insufficient.

Having regard to the above problem, the present invention has for an object to provide a double glazing having high strength and thermal insulation performance.

DISCLOSURE OF THE INVENTION

A double glazing according to the present invention has the following characterizing features:

The double glazing according to claim 1 is characterized in that reinforced sheet glass is employed for at least one of a plurality of sheet glasses, the peripheries of said sheet glasses being sealed by a sealing material having a sealing temperature below 400° C.

Wind pressure strength and fire retardant property are improved by employing reinforced sheet glass for at least one of said plurality of sheet glasses.

In this case, conventional low melting point glass used for sealing double glazing must be baked at 450° C. or above to provide sealing, and therefore the surface compression stress retained on the surfaces of the sheet glass by a reinforcing process could be lost in time of the baking, thereby failing to demonstrate high strength.

However, since, in the present invention, sealing is provided by a sealing material having a sealing temperature below 400° C., the sheet glasses may be bonded together without losing the surface compression stress of the reinforced sheet glasses, thus maintaining the strength.

FIG. 1 shows a relationship between retention time and residual strength under different retention temperatures of a reinforced soda lime glass of 4.6 mm in thickness. That is, FIG. 1 is a view showing how stress is eased with the passage of time where the reinforced soda lime glass is retained at predetermined fixed temperatures. The retention temperatures are set at every 50° C. between 200° C. and 600° C.

The results show that residual strength after retention at 450° C. for 30 minutes lowers to about 25%, but only to about 65% after retention at 400° C. for 30 minutes. That is, to improve residual strength, the lower sealing temperature is the better. It will be seen that a sealing temperature below 400° C. results in a seal little affecting the strength of the sheet glass.

FIG. 2 shows an example of reinforced soda lime glass of 9.5 mm in thickness. This case also shows a tendency similar that in FIG. 1, and no difference due to the thickness of the sheet glass is seen.

In the double glazing according to claim 2, said sealing material may comprises low melting point glass having a bonding strength of at least 20 kg/cm² and a coefficient of thermal expansion at $75-85 \times 10^{-7}/°C$.

By using the low melting point glass having the above bonding strength, this glass adheres tight to the sheet glasses to maintain an excellent seal over a long period of time.

Moreover, the coefficient of thermal expansion of this low melting point glass is $75-85 \times 10^{-7}/°C$. which is smaller by $5-15 \times 10^{-7}/°C$. than the coefficient of thermal expansion, $85-90 \times 10^{-7}/°C$., of ordinary sheet glass. As a result, the bonding strength is maintained without impairing the seal against a compressive force acting on a fused portion to crack the fused portion.

In the double glazing according to claim 3, said low melting point glass may comprise glass powder of a composition including 70.0–80.0% by weight of PbO, 5.0–12.0% by weight of $B_2O_3$, 2.0–10.0% by weight of ZnO, 0.5–3.0% by weight of $SiO_2$, 0–2.0% by weight of $Al_2O_3$, 3.0–7.0% by weight of $Bi_2O_3$, 0.5–5.0% by weight of CuO, and 0.1–6.0% by weight of $F(F_2)$.

Where the low melting point glass of this composition is used, fluidity is high and residual stress may be reduced even at a temperature of 400° C. or below.

With this composition in particular, the above characteristic is outstanding where the mole ratio of $Cu^+/(Cu^+ + Cu^{2+})$ in the low melting point glass is 50% or more.

The coefficient of thermal expansion of the low melting point glass may be matched to the coefficient of thermal expansion of the sheet glasses by appropriately mixing the low melting point glass with ceramic powder.

In the double glazing according to claim 4, said low melting point glass may have a composition including 70.3–92.0% by weight of PbO, 1.0–10.0% by weight of $B_2O_3$, 5.2–20.0% by weight of $Bi_2O_3$, 0.01–8.0% by weight of $F_2$, 0–15.0% by weight of ZnO, 0–5.0% by weight of $V_2O_5$, 0–2.0% by weight of $SiO_2$, 0–2.0% by weight of $Al_2O_3$, 0–2.0% by weight of $SnO_2$ and 0–4.0% by weight of BaO, $B_2O_3/PbO$ being in a weight ratio of 0.11 or less.

Where the low melting point glass of this composition is used, excellent fluidity is maintained even at a temperature of 400° C. or below, to seal the sheet glasses without application of a strong pressure. Thus, the double glazing may be manufactured with improved efficiency. The coefficient of thermal expansion of the low melting point glass may be matched to the coefficient of thermal expansion of the sheet glasses by appropriately mixing the low melting point glass with ceramic powder.

In the double glazing according to claim 5, said low melting point glass may have a composition including 65.0–85.0% by weight of PbO, 1.0–11.0% by weight of $B_2O_3$, 7.2–20.0% by weight of $Bi_2O_3$, 0–6.0% by weight of $F(F_2)$, 0–11.0% by weight of ZnO, 0–4.0% by weight of $V_2O_5$, 0–3.0% by weight of $SiO_2+Al_2O_3$, 0–5.0% by weight of $SnO_2$, 0–0.1% by weight of $Fe_2O_3$ and 0.2–5.0% by weight of CuO.

Where the low melting point glass of this composition is used, residual stress in time of sealing may be reduced.

As in the third and fourth characteristic compositions, the coefficient of thermal expansion of the low melting point glass may be matched to the coefficient of thermal expansion of the sheet glasses by appropriately mixing the low melting point glass with ceramic powder.

The sheet glass according to claim 6 may be float glass of a composition including 70.0–73.0% by weight of $SiO_2$, 1.0–1.8% by weight of $Al_2O_3$, 0.08–0.14% by weight of $Fe_2O_3$, 7.0–12.0% by weight of CaO, 1.0–4.5% by weight of MgO and 13.0–15.0% by weight of $R_2O$ (R being an alkali metal), and the reinforced sheet glass may be heat reinforced sheet glass or chemically reinforced sheet glass.

Where said sheet glass is float glass having the above composition and, moreover, heat reinforced sheet glass or chemically reinforced sheet glass is used as said reinforced sheet glass, a seal is provided by baking the above low melting point glass, without significantly lowering the strength of the reinforced sheet glass, to form a sealed space between the sheet glasses.

The double glazing according to claim 7 is characterized by comprising heat reinforced sheet glass having a surface compression stress, after said sealing, in a range of 204 or more to less than 650 $kg/cm^2$.

This reinforced sheet glass has a higher wind pressure strength than ordinary float glass. Consequently, the reinforced sheet glass may be formed thin when used for a curtain wall of an ordinary building. As a result, the reinforced sheet glass becomes lightweight, which provides an advantage of facilitating a mounting operation at an elevated location.

The double glazing according to claim 8 is characterized by comprising heat reinforced sheet glass having a surface compression stress, after said sealing, in a range of 650 or more to less than 1500 $kg/cm^2$.

The reinforced sheet glass of this construction has a high impact resistance as noted above. Thus, where it is used for a glass door at an entrance, for example, said glass door does not break easily when a passing person should inadvertently collide with the glass door.

Even when the reinforced sheet glass should break, it would break into numerous fragments to assure an excellent safety aspect.

The double glazing according to claim 9 is characterized by comprising heat reinforced sheet glass having a surface compression stress, after said sealing, in a range of 1500 or more to 2400 $kg/cm^2$ or less.

The reinforced sheet glass of this construction has a high surface compression stress as noted above. Thus, this reinforced sheet glass may be used as a heatproof reinforced glass for preventing spreading of fire, for example.

In the double glazing according to claim 10, said reinforced sheet glass may be a chemically reinforced sheet glass obtained by a low temperature ion exchange method in which the sheet glass is immersed in a soaking liquid heated to 350–530° C., to exchange alkali ions in the glass with ions having a larger radius.

Also where said reinforced glass is the above chemically reinforced glass, a seal is provided by baking the above low melting point glass, without significantly lowering the strength of the reinforced sheet glass, to form a sealed space between the sheet glasses.

In the double glazing according to claim 11, said plurality of sheet glasses may define a space therebetween maintained in a decompressed state.

By maintaining the space between said plurality of sheet glasses in a decompressed state as noted above, the heat insulating property of said space may be maintained over a long period of time.

As set forth in claims 1 to 11, the sealing material having a high bonding strength and sealing performance is used to maintain the space between the plurality of sheet glasses in a highly airtight condition, thereby to demonstrate excellent insulation.

Compared with use of a conventional sealing material, a seal may be provided at a low temperature to maintain the strength of the sheet glass. Thus, the invention provides a double glazing which may be used for window panes of multistory buildings and window panes of vehicles, and for fire protection, and so on.

BEST MODE FOR CARRYING OUT THE INVENTION

An embodiment of double glazing according to the present invention will be described with reference to the drawings.

Figure 3:
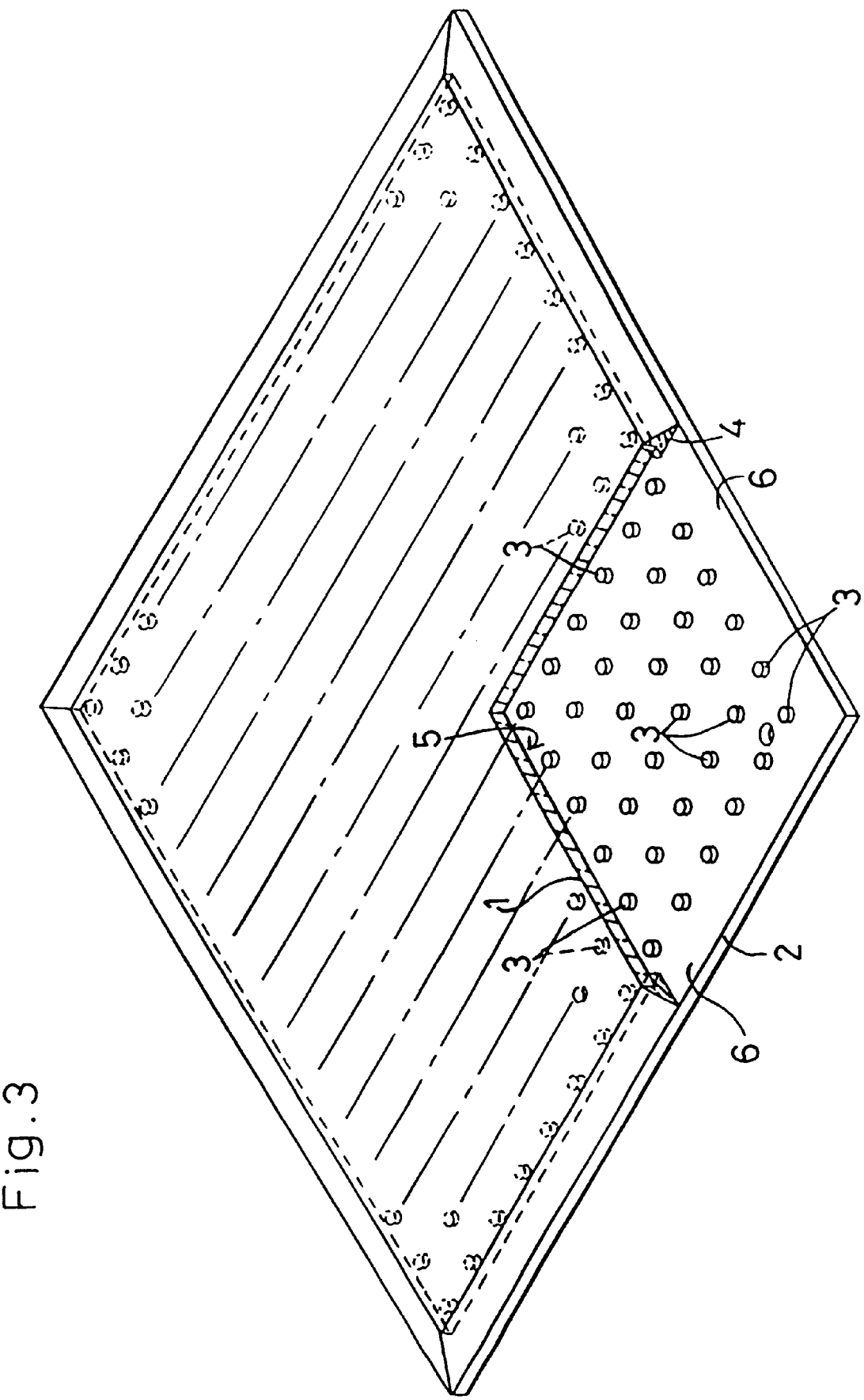
FIG. 3 is a perspective view, partly broken away, showing a double glazing.

The double glazing of the present invention, as shown in FIG. 3, for example, is formed of a pair of sheet glasses 1 and 2 juxtaposed in the direction of thickness with spacers 3 arranged in between. The pair of sheet glasses 1 and 2 are manufactured by a float glass process, for example. Said spacers 3 are formed of metal, and arranged at intervals in the direction of plane of sheet glasses 1 and 2. The pair of sheet glasses 1 and 2 juxtaposed are sealed airtight with peripheries thereof bonded together throughout the circumference. Low melting point glass 4 is used for this bonding. An airtight space 5 between the two sheet glasses 1 and 2 is placed in a vacuum or decompressed state. The degree of decompression is set to $1.0 \times 10^{-3}$ Torr or less, for example.

Said sheet glasses 1 and 2 have a composition including 70.0–73.0% by weight of $SiO_2$, 1.0–1.8% by weight of $Al_2O_3$, 0.08–0.14% by weight of $Fe_2O_3$, 7.0–12.0% by weight of CaO, 1.0–4.5% by weight of MgO and 13.0–15.0% by weight of $R_2O$ (R being an alkali metal). The coefficient of linear expansion is $8.5 \times 10^{-6}$/°C. and the softening temperature is 720–730° C. Further, the distortion point is 500–520° C.

These sheet glasses 1 and 2 are heated to 600° C.–700° C., and thereafter quenched to a surface temperature 500–520° C. by spraying air jets from numerous nozzles for several seconds to ten seconds. This results in heat reinforced sheet glasses 1 and 2 with a surface compression stress in the range of 300–1500 $kg/cm^2$.

Figure 1:
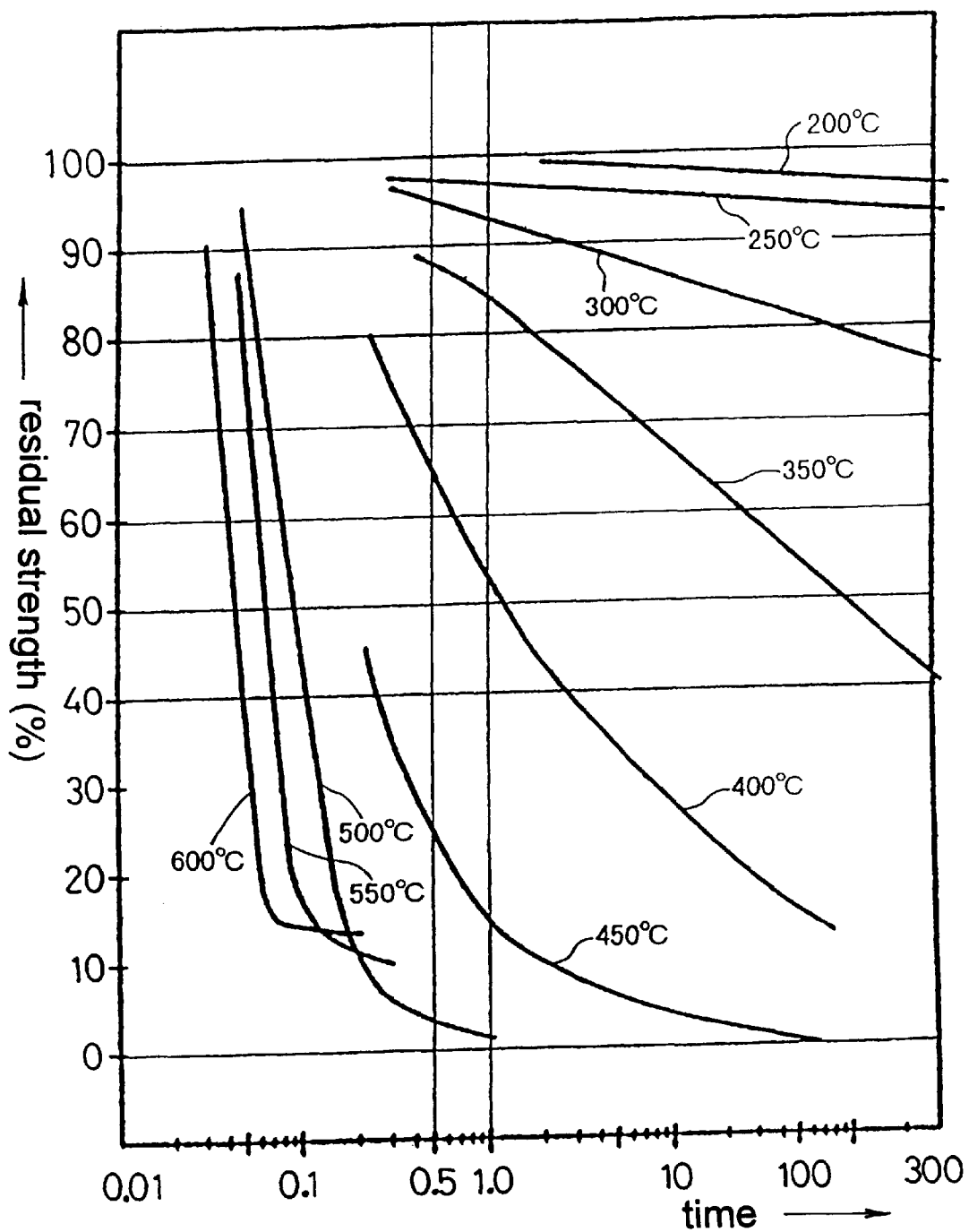
FIG. 1 is a graph showing a relationship between retention time and residual strength under different retention temperatures of a reinforced sheet glass of 4.6 mm in thickness.
Figure 2:
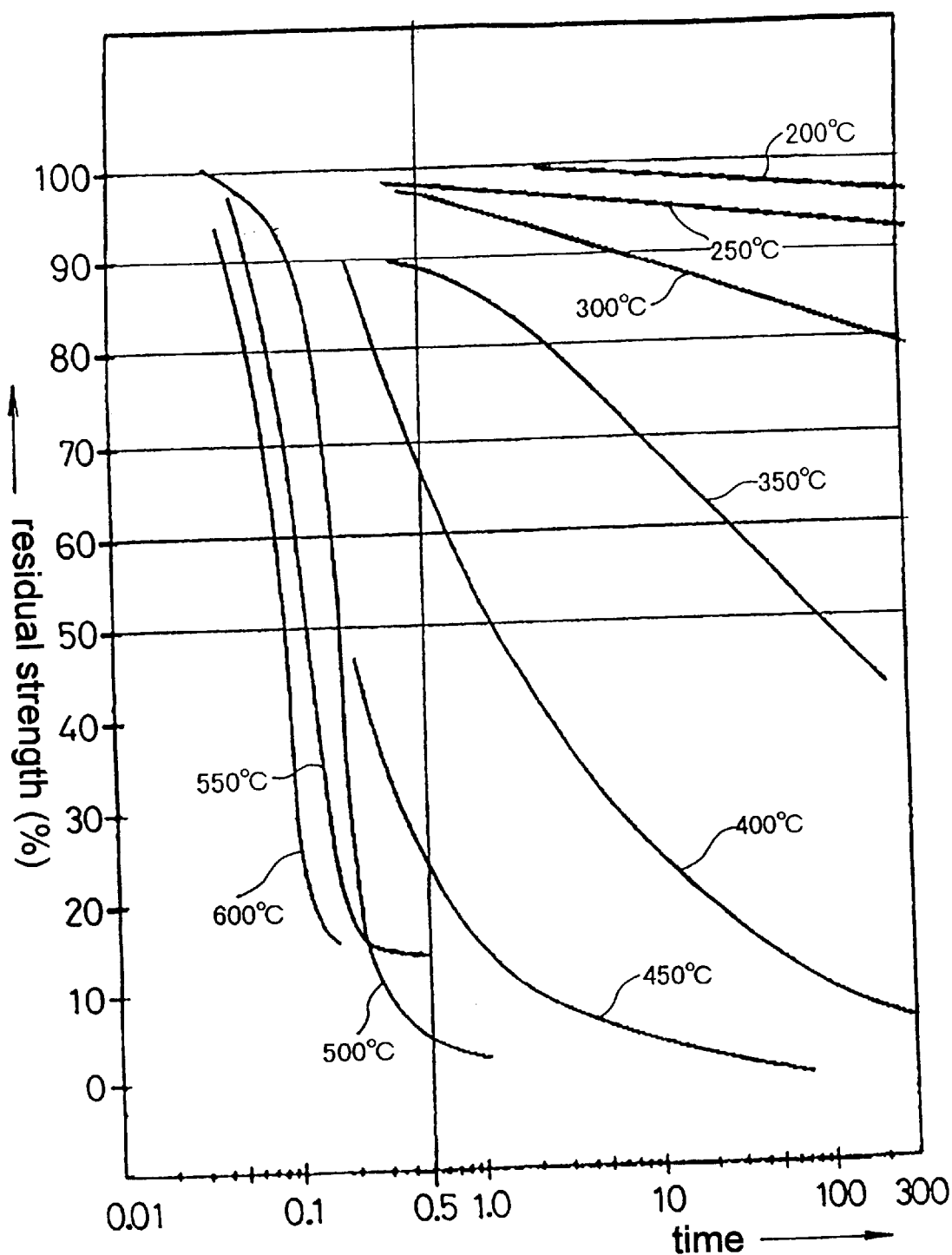
FIG. 2 is a graph showing a relationship between retention time and residual strength under different retention temperatures of a reinforced sheet glass of 9.5 mm in thickness.

When quenching the sheet glasses 1 and 2, as seen from FIG. 1, the reinforcement of the sheet glass lowers to some degree with the quenching. Therefore, in determining the above composition or the like, it is necessary to take into account varied performances required at a point of time when the double glazing is completed.

Said low melting point glass 4 is a glass frit formed by blending 60% by weight of glass having a composition including 72.94% by weight of PbO, 6.71% by weight of $Bi_2O_3$, 8.96% by weight of $B_2O_3$, 4.42% by weight of ZnO, 1.46% by weight of $SiO_2$, 1.58% by weight of CuO and 3.93% by weight of F; and 40% by weight of titanate filler.

Said pair of sheet glasses 1 and 2 are transparent sheet glasses each having a thickness of 3 mm. The 3 mm is a size according to JIS standard, which substantially corresponds to a thickness of 2.7–3.3 mm, taking thickness errors into account.

On the other hand, said spacers 3 arranged between the pair of sheet glasses 1 and 2 are 0.30–1.00 mm in diameter, and 0.1–0.5 mm in height. Thus, the overall thickness of completed double glazing is approximately 6 mm.

Further, said spacers 3 have circular surfaces for contacting the sheet glasses. Consequently, stress concentration in the two sheet glasses 1 and 2 is eased in regions of contact between the two sheet glasses 1, 2 and spacers 3, thereby preventing breaking and the like of sheet glasses 1 and 2.

The sheet glasses 1 and 2 are arranged such that one sheet glass 2 protrudes at the outer peripheries thereof along the direction of plane. That is, in sealing the two sheet glasses 1 and 2, the low melting point glass 4 is placed on these protruding portions 6. With this construction, the low melting point glass 4 may be placed in position easily, and the airtight space 5 may be formed between the two sheet glasses 1 and 2 efficiently and reliably.

[Other Embodiments]

<1> Said low melting point glass 4 may be glass powder having a composition including 70.0–80.0% by weight of PbO, 5.0–12.0% by weight of $B_2O_3$, 2.0–10.0% by weight of ZnO, 0.5–3.0% by weight of $SiO_2$, 0–2.0% by weight of $Al_2O_3$, 3.0–7.0% by weight of $Bi_2O_3$, 0.5–5.0% by weight of CuO, and 0.1–6.0% by weight of $F(F_2)$.

It is important here that the mole ratio of $Cu^+/(Cu^++Cu^{2+})$ in the glass is 50% or more. This assures a seal having a high degree of fluidity and a small residual stress even at a temperature of 400° C. or below. Of course, ceramic powder may be used to match the expansion coefficient with the sheet glasses as in the two preceding examples.

<2> As a different type of said low melting point glass 4, the composition may include 70.3–92.0% by weight of PbO, 1.0–10.0% by weight of $B_2O_3$, 5.2–20.0% by weight of $Bi_2O_3$, 0.01–8.0% by weight of $F_2$, 0–15.0% by weight of ZnO, 0–5.0% by weight of $V_2O_5$, 0–2.0% by weight of $SiO_2$, 0–2.0% by weight of $Al_2O_3$, 0–2.0% by weight of $SnO_2$ and 0–4.0% by weight of BaO, which may be adjusted by mixing ceramic powder thereinto to match the coefficient of thermal expansion with the sheet glass.

The composition of this low melting point glass 4 is characterized in that $B_2O_3/PbO$ is in a weight ratio of 0.11 or less and that it contains $F_2$. It has excellent fluidity even at a temperature of 400° C. or below, and is capable of forming a seal without application of a strong pressure.

<3> As a further different type of said low melting point glass 4, the composition may include 65.0–85.0% by weight of PbO, 1.0–11.0% by weight of $B_2O_3$, 7.2–20.0% by weight of $Bi_2O_3$, 0–6.0% by weight of $F(F_2)$, 0–11.0% by weight of ZnO, 0–4.0% by weight of $V_2O_5$, 0–3.0% by weight of $SiO_2+Al_2O_3$, 0–5.0% by weight of $SnO_2$, 0–0.1% by weight of $Fe_2O_3$ and 0.2–5.0% by weight of CuO, which may be adjusted by mixing ceramic powder thereinto to match the coefficient of thermal expansion with the sheet glass.

The composition of this low melting point glass 4 is characterized in that it contains CuO and that the $Fe_2O_3$ content is 0.1% by weight or less, to provide a low melting point sealing composition with a small residual stress in time of sealing.

<4> As said sheet glasses 1 and 2, said chemically reinforced glass may be used instead of said heat reinforced glass. For example, sheet glass to be used may be immersed in potassium nitrate in molten state (at a temperature of 470° C.) for 4.5 hours, and subsequently lifted therefrom and annealed.

The airtight space 5 between said two sheet glasses 1 and 2 may be at atmospheric pressure.

Said two sheet glasses 1 and 2 may be the same size, or may be different in thickness.

<5> The double glazing according to the present invention may be constructed as follows, for example.

First, heat reinforced glass is obtained by quenching sheet glass heated to 600° C.–650° C. Next, a double glazing is formed as including at least one heat reinforced glass noted above. In this case, after arranging the spacers in place, the heat reinforced glass is sealed by using a sealing material. Said heat reinforced glass sealed is adapted to have a surface compression stress in the range of 204 or more and less than 650 $kg/cm^2$.

The surface compression stress of the heat reinforced glass lowers to some degree by heating done at the sealing step. It is therefore necessary to take the above lowering into account and set the surface compression stress at the point of time when the quenching is completed to be high.

The reinforced sheet glass of this construction has a high wind pressure strength compared with ordinary float glass. Consequently, the reinforced sheet glass may be formed thin when used for a curtain wall of an ordinary building in a way to secure a wind pressure strength comparable to an ordinary curtain wall. As a result, the reinforced sheet glass becomes lightweight and facilitates an installing operation. In particular, a mounting operation at an elevated location is made easy to improve workability.

As said double glazing, heat reinforced glass may be used which has a surface compression stress after the sealing step at 650 or more and less than 1500 $kg/cm^2$. The heat-reinforced sheet glass before the sealing is formed by heating sheet glass to 600° C.–650° C. and quenching it to a 500–520° C. surface temperature. As in the foregoing case, the surface compression stress of the heat reinforced sheet glass before the sealing is set higher than the surface compression stress in a state where the double glazing is completed.

The reinforced sheet glass of this construction has a high impact resistance as noted above. Thus, it may be used for a glass door at an entrance, for example. In this case, said glass door does not break easily when a passing person should inadvertently collide with the glass door. Even when the reinforced sheet glass should break, it would break into numerous fragments to assure an excellent safety aspect.

Further, as said double glazing, heat reinforced glass may be used which has a surface compression stress after the sealing step at 1500 or more and less than 2400 $kg/cm^2$. The heat reinforced sheet glass before the sealing is formed by heating sheet glass to 600° C.–700° C. and quenching it to a 300° C. or less surface temperature. As in the foregoing case, the surface compression stress of the heat reinforced sheet glass before the sealing is set higher than the surface compression stress in a state where the double glazing is completed.

The reinforced sheet glass of this construction has a particularly high surface compression stress as noted above. Thus, this reinforced sheet glass may be used as a heatproof reinforced glass for preventing spreading of fire, for example.

<6> Said two sheet glasses 1 and 2 are not limited to the sheet glass having the thickness of 2.7 mm–3.3 mm described in the foregoing embodiment, but may be a sheet glass of other thickness.

The type of glass may be selected as desired, and may, for example, be figured glass, ground glass (glass surface-treated to be given a function for diffusing light), wire glass (on one side), sheet glass with a function for absorbing heat rays, absorbing ultraviolet rays, or reflecting heat rays, or a combination of these.

Further, the pair of sheet glasses 1 and 2 are not limited to having the same thickness, but the double glazing may comprise a combination of sheet glasses different in thickness.

<7> The two sheet glasses 1 and 2 constituting said double glazing are not limited in size or shape, but may have any desired size and shape. The two sheet glasses 1 and 2 may be stacked together with the edges thereof placed flush. The double glazing may comprise a combination of one sheet glass 1 and the other sheet glass 2 different in thickness and dimension.

<8> Said two sheet glasses 1 and 2 are not limited to planar glasses, but may be curved glasses, for example.

<9> Said spacers 3 will serve the purpose as long as they are not readily deformable so that the two sheet glasses 1 and 2 remain out of contact with each other despite an external force. For example, stainless steel, or other metals, quartz glass, ceramics, glass, low melting point glass and so on may be used.

<10> The sealing material for sealing the double glazing will serve the purpose as long as its sealing temperature is below 400° C. In the embodiment, the sealing material has been described as having low melting point glass as a main component, but may be a material having a metal solder as a main component.

Industrial Utility

The double glazing according to the present invention may be used for varied purposes. It may be used, for example, for construction, for vehicles (window panes of automobiles, window panes of railway carriages, and window panes of ships), and for elements of machinery and tools (surface glass of plasma displays, doors and walls of refrigerators, doors and walls of heat insulated apparatus).

What is claimed is:

1. A double glazing comprising:
a plurality of sheet glasses juxtaposed in the direction of thickness with spacers arranged in between, the peripheries of said sheet glasses being sealed through the circumference thereof, wherein at least one of said plurality of sheet glasses is a reinforced sheet glass, said reinforced sheet glass having a surface compression stress in a range of from 204 to less than 2400 kg/cm$^2$ after sealing;
wherein the peripheries of said sheet glasses are sealed by a sealing material comprising low melting point glass having a bonding strength of at least 20 kg/cm$^2$ and a coefficient of thermal expansion at 75–85×10$^{-7}$/°C. and having a sealing temperature below 400° C.

2. A doubleglazing comprising:
a plurality of sheet glasses juxtaposed in the direction of thickness with spacers arranged in between, the peripheries of said sheet glasses being sealed throughout the circumference thereof,
wherein the peripheries of said sheet glasses are sealed by a sealing material having a sealing temperature below 400° C. and the double glazing employs a reinforced sheet glass for at least one of said plurality of sheet glasses, said reinforced sheet glass having a surface compression stress in a range of from 204 to less than 2400 kg/cm$^2$
said sealing material comprises low melting point glass having a bonding strength of at least 20 kg/cm$^2$ and a coefficient of thermal expansion at 75–85×10$^{-7}$/°C.; and
said low melting point glass being a glass powder composition comprising 70.0–80.0% by weight of PbO, 5.0–12.0% by weight of B$_2$O$_3$, 2.0–10.0 by weight of ZnO, 0.5–3.0% by weight of SiO$_2$, 0–2.0% by weight of Al$_2$O$_3$, 3.0–7.0% by weight of Bi$_2$O$_3$, 0.5–5.0% by weight of CuO, and 0.1–6.0% by weight of F (F$_2$).

3. A double glazing comprising:
a plurality of sheet glasses juxtaposed in the direction of thickness with spacers arranged in between, peripheries of said sheet glasses being sealed throughout the circumference thereof;
wherein the peripheries of said sheet glasses being sealed by a sealing material having a sealing temperature below 400° C. and the double glazing employs a reinforced sheet glass for at least one of said plurality of sheet glasses, said reinforced sheet glass having a surface compression stress in a range of from 204 to less than 2400 kg/cm$^2$ after said sealing,
said sealing material comprises low melting point glass having a bonding strength of at least 20 kg/cm$^2$ and a coefficient of thermal expansion at 75–85×10$^{-7}$/°C.; and
said low melting point glass comprising 70.3–92.0% byweight of PbO, 1.0–10.0% by weight of B$_2$O$_3$, 5.2–20.0% by weight of Bi$_2$O$_3$, 0.01–8.0% by weight of F$_2$, 0–15.0% by weight of ZnO, 0–5.0% by weight of V$_2$O$_5$, 0–2.0% by weight of SiO$_2$, 0–2.0% by weight of Al$_2$O$_3$, 0–2.0% by weight of SnO$_2$, and 0–4.0% by weight of BaO, B$_2$O$_3$/PbO being in a weight ratio of 0.11 or less.

4. A double glazing comprising:
a plurality of sheet glasses juxtaposed in the direction of thickness with spacers arranged in between, peripheries of said sheet glasses being sealed throughout the circumference thereof,
wherein the peripheries of said sheet glasses being sealed by a sealing material having a sealing temperature below 400° C. and the double glazing employs a reinforced sheet glass for at least one of said plurality of sheet glasses, said reinforced sheet glass having a surface compression stress in a range of from 204 to less than 2400 kg/cm$^2$ after said sealing,
said sealing material comprises low melting point glass having a bonding strength of at least 20 kg/cm$^2$ and a coefficient of thermal expansion at 75–85×10$^{-7}$/°C.; and
said low melting point glass has a composition including 65.0–85.0% by weight of PbO, 1.0–11.0% by weight of B$_2$O$_3$, 7.2–20.0% by weight of Bi$_2$O$_3$, 0–6.0% by weight of F (F$_2$,), 0–11.0% by weight of ZnO, 0–4.0% by weight of V$_2$O$_5$, 0–3.0% by weight of SiO$_2$+Al$_2$O$_3$, 0–5.0% by weight of SnO$_2$, 0–0.1% by weight of Fe$_2$O$_3$, and 0.2–5.0% by weight of CuO.

5. The double glazing of claim 1, wherein said plurality of sheet glasses are float sheet glasses each having a composition including 70.0–73.0% by weight of SiO$_2$, 1.0–1.8% by weight of $Al_2O_3$, 0.08–0.14% by weight of $Fe_2O_3$, 7.0–12.0% by weight of CaO, 1.0–4.5% by weight of MgO and 13.0–15.0% by weight of $R_2O$ (R being an alkali metal) and said reinforced sheet glass comprises a heat reinforced sheet glass prepared by heat-reinforcing said sheet glass or a chemically reinforced sheet glass prepared by chemically reinforcing said sheet glass.

6. The double glazing of claim 2, wherein said plurality of sheet glasses are float sheet glasses each having a composition including 70.0–73.0% by weight of $SiO_2$, 1.0–1.8% by weight of $Al_2O_3$, 0.08–0.14% by weight of $Fe_2O_3$, 7.0–12.0% by weight of CaO, 1.0–4.5% by weight of MgO and 13.0–15.0% by weight of $R_2O$ (R being an alkali metal) and said reinforced sheet glass comprises a heat reinforced sheet glass prepared by heat-reinforcing said sheet glass or a chemically reinforced sheet glass prepared by chemically reinforcing said sheet glass.

7. The double glazing of claim 3, wherein said plurality of sheet glasses are float sheet glasses each having a composition including 70.0–73.0% by weight of $SiO_2$, 1.0–1.8% by weight of $Al_2O_3$, 0.08–0.14% by weight of $Fe_2O_3$, 7.0–12.0% by weight of CaO, 1.0–4.5% by weight of MgO and 13.0–15.0% by weight of $R_2O$ (R being an alkali metal) and said reinforced sheet glass comprises a heat reinforced sheet glass prepared by heat-reinforcing said sheet glass or a chemically reinforced sheet glass prepared by chemically reinforcing said sheet glass.

8. The double glazing of claim 4, wherein said plurality of sheet glasses are float sheet glasses each having a composition including 70.0–73.0% by weight of $SiO_2$, 1.0–1.8% by weight of $Al_2O_3$, 0.08–0.14% by weight of $Fe_2O_3$, 7.0–12.0% by weight of CaO, 1.0–4.5% by weight of MgO and 13.0–15.0% by weight of $R_2O$ (R being an alkali metal) and said reinforced sheet glass comprises a heat reinforced sheet glass prepared by heat-reinforcing said sheet glass or a chemically reinforced sheet glass prepared by chemically reinforcing said sheet glass.

9. The double glazing of claim 1, wherein said reinforced sheet glass comprises a heat reinforced sheet glass having a surface compression stress in a range of 204 or more to less than 650 $kg/cm^2$ after said sealing.

10. The double glazing of claim 2, wherein said reinforced sheet glass comprises a heat reinforced sheet glass having a surface compression stress in a range of 204 or more to less than 650 $kg/cm^2$ after said sealing.

11. The double glazing of claim 3, wherein said reinforced sheet glass comprises a heat reinforced sheet glass having a surface compression stress in a range of 204 or more to less than 650 $kg/cm^2$ after said sealing.

12. The double glazing of claim 4, wherein said reinforced sheet glass comprises a heat reinforced sheet glass having a surface compression stress in a range of 204 or more to less than 650 $kg/cm^2$ after said sealing.

13. The double glazing of claim 1, wherein said reinforced sheet glass comprises a heat reinforced sheet glass having a surface compression stress in a range of 650 or more to less than 1500 $kg/cm^2$ after said sealing.

14. The double glazing of claim 2, wherein said reinforced sheet glass comprises a heat reinforced sheet glass having a surface compression stress in a range of 650 or more to less than 1500 $kg/cm^2$ after said sealing.

15. The double glazing of claim 3, wherein said reinforced sheet glass comprises a heat reinforced sheet glass having a surface compression stress in a range of 650 or more to less than 1500 $kg/cm^2$ after said sealing.

16. The double glazing of claim 4, wherein said reinforced sheet glass comprises a heat reinforced sheet glass having a surface compression stress in a range of 650 or more to less than 1500 $kg/cm^2$ after said sealing.

17. The double glazing of claims 1, wherein said reinforced sheet glass comprises a heat reinforced sheet glass having a surface compression stress in a range of 1500 or more to less than 2400 $kg/cm^2$ after said sealing.

18. The double glazing of claims 2, wherein said reinforced sheet glass comprises a heat reinforced sheet glass having a surface compression stress in a range of 1500 or more to less than 2400 $kg/cm^2$ after said sealing.

19. The double glazing of claims 3, wherein said reinforced sheet glass comprises a heat reinforced sheet glass having a surface compression stress in a range of 1500 or more to less than 2400 $kg/cm^2$ after said sealing.

20. The double glazing of claims 4, wherein said reinforced sheet glass comprises a heat reinforced sheet glass having a surface compression stress in a range of 1500 or more to less than 2400 $kg/cm^2$ after said sealing.

21. The double glazing of claim 1, wherein said reinforced sheet glass comprises a chemically reinforced sheet glass obtained by a low temperature ion exchange method in which the sheet glass is immersed in a soaking liquid heated to 350–530° C., to exchange alkali ions in the glass with ions having a larger radius.

22. The double glazing of claim 2, wherein said reinforced sheet glass comprises a chemically reinforced sheet glass obtained by a low temperature ion exchange method in which the sheet glass is immersed in a soaking liquid heated to 350–530° C., to exchange alkali ions in the glass with ions having a larger radius.

23. The double glazing of claim 3, wherein said reinforced sheet glass comprises a chemically reinforced sheet glass obtained by a low temperature ion exchange method in which the sheet glass is immersed in a soaking liquid heated to 350–530° C., to exchange alkali ions in the glass with ions having a larger radius.

24. The double glazing of claim 4, wherein said reinforced sheet glass comprises a chemically reinforced sheet glass obtained by a low temperature ion exchange method in which the sheet glass is immersed in a soaking liquid heated to 350–530° C., to exchange alkali ions in the glass with ions having a larger radius.

25. The double glazing of claim 1, wherein said plurality of sheet glasses define a space therebetween maintained in a decompressed state.

26. The double glazing of claim 2, wherein said plurality of sheet glasses define a space therebetween maintained in a decompressed state.

27. The double glazing of claim 3, wherein said plurality of sheet glasses define a space therebetween maintained in a decompressed state.

28. The double glazing of claim 4, wherein said plurality of sheet glasses define a space therebetween maintained in a decompressed state.

* * * * *